(12) United States Patent
Gurunathan et al.

(10) Patent No.: US 11,107,082 B2
(45) Date of Patent: Aug. 31, 2021

(54) METHOD AND SYSTEM FOR AUTHORIZING AN ELECTRONIC TRANSACTION

(71) Applicant: MASTERCARD INTERNATIONAL INCORPORATED, Purchase, NY (US)

(72) Inventors: Arunmurthy Gurunathan, Pune (IN); Ravi Pareek, Pune (IN); Ganesh Shinde, Pune (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 995 days.

(21) Appl. No.: 15/668,948

(22) Filed: Aug. 4, 2017

(65) Prior Publication Data

US 2018/0053190 A1 Feb. 22, 2018

(30) Foreign Application Priority Data

Aug. 17, 2016 (SG) .............................. 10201606866P

(51) Int. Cl.
*G06Q 40/00* (2012.01)
*G06Q 20/40* (2012.01)
(Continued)

(52) U.S. Cl.
CPC ... *G06Q 20/40145* (2013.01); *G06K 9/00288* (2013.01); *G06K 9/6202* (2013.01);
(Continued)

(58) Field of Classification Search
USPC .......................................................... 705/44
See application file for complete search history.

(56) References Cited

U.S. PATENT DOCUMENTS

2008/0019684 A1* 1/2008 Shyu .................... H04N 5/2259
396/332
2008/0084482 A1* 4/2008 Hansson ................ H04N 5/272
348/218.1
(Continued)

OTHER PUBLICATIONS

Sarah Clark, "MasterCard and Visa to create new security standard to replace passwords for online payments", Nov. 13, 2014, www.ttec.com (Year: 2014).*

(Continued)

*Primary Examiner* — Ryan D Donlon
*Assistant Examiner* — Irene S Kang
(74) *Attorney, Agent, or Firm* — Talem IP Law, LLP

(57) ABSTRACT

A method and system are provided for authorizing an electronic transaction between two entities. The method includes receiving, at a verification module, coincidentally captured facial image data relating to both of the two entities and authenticating each of the two entities based on a comparison between the coincidentally captured facial image data and respective facial image templates relating to each of the two entities enrolled in a database. The method also includes retrieving, from the database, account data relating to each of the two entities based on the coincidentally captured facial image data, on determining that each of the two entities are positively authenticated, and generating an authorization message for authorizing the electronic transaction, where the authorization message comprises the account data relating to each of the two entities retrieved from the database.

18 Claims, 8 Drawing Sheets

(51) Int. Cl.
*G06K 9/00* (2006.01)
*H04N 5/225* (2006.01)
*G06Q 20/38* (2012.01)
*G06K 9/62* (2006.01)
*G06F 21/00* (2013.01)

(52) U.S. Cl.
CPC ......... *G06Q 20/388* (2013.01); *H04N 5/2258* (2013.01); *H04N 5/2253* (2013.01)

(56) References Cited

U.S. PATENT DOCUMENTS

| | | | |
|---|---|---|---|
| 2008/0267606 A1* | 10/2008 | Wolcott | H04N 5/2621 396/332 |
| 2011/0261214 A1* | 10/2011 | Hope | H04N 5/23219 348/211.11 |
| 2012/0196649 A1* | 8/2012 | Havens | H04N 5/23229 455/556.1 |
| 2012/0274808 A1* | 11/2012 | Chong | H04N 5/232933 348/234 |
| 2015/0033305 A1* | 1/2015 | Shear | G06F 21/53 726/6 |
| 2015/0146028 A1* | 5/2015 | Choi | H04N 5/247 348/211.11 |
| 2016/0182799 A1* | 6/2016 | Laaksonen | G06F 3/16 348/211.11 |
| 2017/0061438 A1* | 3/2017 | Patel | G06Q 20/042 |
| 2017/0372282 A1* | 12/2017 | Sarin | G06Q 20/20 |

OTHER PUBLICATIONS

"Handbook of Face Recognition", Stan Z. Li and Anil K. Jain, Spring, NY 2011; 27 pgs.

\* cited by examiner

| Facial image templates | Account data | Reference geographical location data |
|---|---|---|
| A | 01-356-8944 | New York City |
| B | 01-790-2356 | Los Angeles |
| C | 04-316-8118 | New York City |
| D | 03-227-7126 | San Francisco |

Table 1

| Transaction identifier | Coincidentally captured facial image data | Time-stamp of transaction |
|---|---|---|
| PX56001 | | 2/7/16 \| 14:35 |
| J7689S0 | | 3/7/16 \| 19:06 |
| 76547MN | | 3/7/16 \| 19:49 |
| 44556GT | | 4/7/16 \| 09:51 |

Table 2

Figure 1A

METHOD AND SYSTEM FOR AUTHORIZING AN ELECTRONIC TRANSACTION

CROSS-REFERENCE TO RELATED APPLICATION

This application claims the benefit of and priority to Singapore Patent Application No. 10201606866P filed Aug. 17, 2016. The entire disclosure of the above application is incorporated herein by reference.

FIELD

The present disclosure relates broadly, but not exclusively, to methods and systems for authorizing an electronic transaction between entities.

BACKGROUND

This section provides background information related to the present disclosure which is not necessarily prior art.

Authorization is an important aspect of processing an electronic transaction, and involves, among other things, authenticating one or more entities participating in the electronic transaction. During authorization, the one or more entities may be electronically identified as an authorized entity. For example, a customer may be required to present his payment card to a merchant and input his personal identification number (PIN) into the merchant's point-of-sale terminal for authorization of an electronic financial transaction. That is, both the PIN and physical payment card provide means for authenticating and authorizing the customer at the merchant's point-of-sale terminal.

However, payment cards, such as credit cards and debit cards, may be misplaced or stolen, which leaves the cardholder vulnerable to financial theft. Moreover, the cardholder may forget his PIN and as a result is unable to complete the electronic transaction.

Electronic transactions may also include electronic fund transfers between two or more entities. Usually, a recipient's bank name and account number is required for the fund transfer. However, such information may be sensitive and the recipient may be reluctant to share such information. Moreover, the account number typically consists of a string of numbers which may be easily forgotten.

A need therefore exists to provide methods and system for authorizing an electronic transaction between entities that seek to address at least some of the above problems.

SUMMARY

This section provides a general summary of the disclosure, and is not a comprehensive disclosure of its full scope or all of its features. Aspects and embodiments of the disclosure are set out in the accompanying claims.

According to a first aspect, there is provided a method for authorizing an electronic transaction between two entities, comprising: receiving, at a verification module, coincidentally captured facial image data relating to both of the two entities; authenticating each of the two entities, using the verification module, based on a comparison between the coincidentally captured facial image data and respective facial image templates relating to each of the two entities enrolled in a database, wherein a positive authentication corresponds to a substantial match between the coincidentally captured facial image data and corresponding ones of the facial image templates, wherein account data relating to each of the two entities is enrolled in the database, and wherein the facial image template and the account data of each entity are linked; retrieving, from the database, the account data relating to each of the two entities based on the coincidentally captured facial image data, on determining that each of the two entities are positively authenticated; and generating, using the verification module, an authorization message for authorizing the electronic transaction, the authorization message comprising the account data relating to each of the two entities retrieved from the database.

The coincidentally captured facial image data may comprise first captured facial image data relating to a first of the two entities and second captured facial image data relating to a second of the two entities. Retrieving the account data relating to each of the two entities based on the coincidentally captured facial image data may comprise: retrieving the account data relating to the first of the two entities that is linked to the facial image template that has a closest similarity with the first captured facial image data; and retrieving the account data relating to the second of the two entities that is linked to the facial image template that has a closest similarity with the second captured facial image data.

A substantial match between the coincidentally captured facial image data and the corresponding ones of the facial image templates may be based on a pre-defined degree of similarity between the first and the second captured facial image data and the corresponding ones of the facial image templates.

The method may further comprise: receiving, at the verification module, a transaction identifier relating to the authorized electronic transaction; and storing, in the database, the transaction identifier in association with the coincidentally captured facial image data relating to both of the two entities.

The method may further comprise: receiving, at the verification module, a time-stamp relating to a date and time of the coincidentally captured facial image data; and storing, in the database, the time-stamp in association with the transaction identifier and the coincidentally captured facial image data relating to both of the two entities.

The method may further comprise generating, using the verification module, a decline message for declining the electronic transaction on a condition that at least one of the two entities is not positively authenticated.

Reference geographical location data relating to each of the two entities may be enrolled in the database and linked to the corresponding ones of the facial image templates. The method may further comprise receiving, at the verification module, current geographical location data relating to a current location of the first of the two entities; comparing, using the verification module, the current geographical location data and the reference geographical location data that is linked to the facial image template that has a closest similarity with the first captured facial image data, wherein the authorization message is generated on determining that there is a substantial match between the current geographical location data and the reference geographical location data that is linked to the facial image template that has the closest similarity with the first captured facial image data.

The coincidentally captured facial image data may be received from a mobile device comprising two image capturing modules, and wherein the first captured facial image data may be captured using a first of the two image capturing modules and the second captured facial image data may be captured using a second of the two image capturing modules.

A first of the two entities may consist of a single payer and a second of the two entities may consist of a single payee, and the electronic transaction may comprise an electronic fund transfer from the single payer to the single payee.

A first of the two entities may consist of a single payer and a second of the two entities may consist of multiple payees, and the electronic transaction may comprise an electronic fund transfer from the single payer to the multiple payees. The facial image template relating to the second of the two entities and the second captured facial image data may comprise facial image data of each of the multiple payees, and the account data relating to the second of the two entities may comprise account data of each of the multiple payees.

A first of the two entities may consist of a customer and a second of the two entities may consist of an employee of a merchant, and the electronic transaction may comprise an electronic financial transaction between the customer and the merchant, wherein reference geographical location data relating to each of the two entities may be enrolled in the database and linked to the corresponding ones of the facial image templates. The method may further comprise: receiving, at the verification module, current geographical location data relating to a current location of the first of the two entities; looking-up, using the verification module, the facial image templates that are linked to the reference geographical location data having a similarity with the current geographical location data; and authenticating the second of the two entities, using the verification module, based on a comparison between the coincidentally captured facial image data and the looked-up facial image templates.

According to a second aspect, there is provided a system for authorizing an electronic transaction between two entities, comprising: a verification module in communication with a mobile device; and a database in communication with the verification module, the database comprising: a facial image template relating to each of the two entities; and account data relating to each of the two entities, wherein the facial image template and the account data of each entity are linked; wherein the verification module is configured to: receive coincidentally captured facial image data relating to both of the two entities from the mobile device; authenticate each of the two entities based on a comparison between the coincidentally captured facial image data and the respective facial image templates relating to each of the two entities, wherein a positive authentication corresponds to a substantial match between the coincidentally captured facial image data and corresponding ones of the facial image templates; retrieve, from the database, the account data relating to each of the two entities based on the coincidentally captured facial image data, on determining that each of the two entities are positively authenticated; and generate an authorization message for authorizing the electronic transaction, the authorization message comprising the account data relating to each of the two entities retrieved from the database.

The coincidentally captured facial image data may comprise first captured facial image data relating to a first of the two entities and second captured facial image data relating to a second of the two entities.

The verification module may be further configured to: retrieve the account data relating to the first of the two entities that is linked to the facial image template that has a closest similarity with the first captured facial image data; and retrieve the account data relating to the second of the two entities that is linked to the facial image template that has a closest similarity with the second captured facial image data.

A substantial match between the coincidentally captured facial image data and the corresponding ones of the facial image templates may be based on a pre-defined degree of similarity between the first and the second captured facial image data and the corresponding ones of the facial image templates.

The verification module may be further configured to: receive a transaction identifier relating to the authorized electronic transaction; and store, in the database, the transaction identifier in association with the coincidentally captured facial image data relating to both of the two entities.

Further, the verification module may be further configured to: receive, from the mobile device, a time-stamp relating to a date and time of the coincidentally captured facial image data; and store, in the database, the time-stamp in association with the transaction identifier and the coincidentally captured facial image data relating to both of the two entities.

The verification module may also be further configured to generate a decline message for declining the electronic transaction on a condition that at least one of the two entities is not positively authenticated.

The database may further comprise reference geographical location data relating to each of the two entities and linked to the corresponding ones of the facial image templates, and wherein the verification module may be further configured to: receive, from the mobile device, current geographical location data relating to a current location of the first of the two entities; compare the current geographical location data and the reference geographical location data that is linked to the facial image template that has a closest similarity with the first captured facial image data, wherein the authorization message may be generated on determining that there is a substantial match between the current geographical location data and the reference geographical location data that is linked to the facial image template that has the closest similarity with the first captured facial image data.

A first of the two entities may consist of a customer and a second of the two entities may consist of an employee of a merchant, and the electronic transaction may comprise an electronic financial transaction between the customer and the merchant, wherein the database may further comprise reference geographical location data relating to each of the two entities and linked to the corresponding ones of the facial image templates, and wherein the verification module may be further configured to: receive current geographical location data relating to a current location of the first of the two entities; look-up the facial image templates that are linked to the reference geographical location data having a similarity with the current geographical location data; and authenticate the second of the two entities based on a comparison between the coincidentally captured facial image data and the looked-up facial image templates.

The verification module may be in communication with a payment module that is configured to facilitate the electronic transaction between the two entities, and wherein the verification module may be further configured to transmit the authorization message to the payment module for authorizing the electronic transaction.

The payment module may be configured to: generate the transaction identifier upon completion of the authorized electronic transaction between the two entities; and transmit the transaction identifier to the verification module.

Further areas of applicability will become apparent from the description provided herein. The description and specific examples and embodiments in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure. Embodiments will be better understood and readily apparent to one of ordinary skill in the art from the following written description, by way of example only, and in conjunction with the drawings, in which:

FIG. 1A illustrates Tables 1 and 2, where Table 1 shows facial image templates, account data and reference geographical location data enrolled in a database, according to an example embodiment; and where Table 2 shows transaction identifiers, coincidentally captured facial image data, and transaction time-stamps enrolled in a database, according to an example embodiment;

Corresponding reference numerals indicate corresponding parts throughout the several views of the drawings.

DETAILED DESCRIPTION

Figure 1:
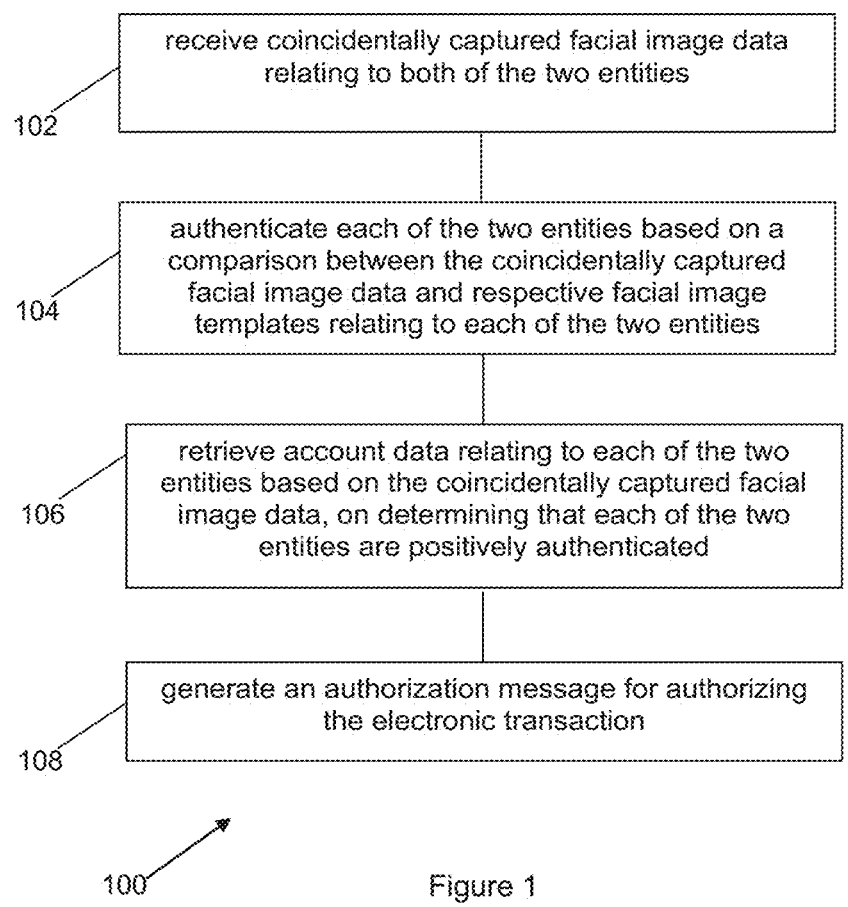
FIG. 1 shows a flow chart illustrating a method for authorizing an electronic transaction between two entities, according to an example embodiment.

Embodiments will be described, by way of example only, with reference to the drawings. Again, like reference numerals and characters in the drawings refer to like elements or equivalents. The description and specific examples included herein are intended for purposes of illustration only and are not intended to limit the scope of the present disclosure.

Some portions of the description which follows are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "receiving", "scanning", "calculating", "determining", "replacing", "generating", "initializing", "outputting", or the like, refer to the action and processes of a computer system, or similar electronic device, that manipulates and transforms data represented as physical quantities within the computer system into other data similarly represented as physical quantities within the computer system or other information storage, transmission or display devices.

The present specification also discloses apparatus for performing the operations of the methods. Such apparatus may be specially constructed for the required purposes, or may comprise a computer or other device selectively activated or reconfigured by a computer program stored in the computer. The algorithms and displays presented herein are not inherently related to any particular computer or other apparatus. Various machines may be used with programs in accordance with the teachings herein. Alternatively, the construction of more specialized apparatus to perform the required method steps may be appropriate. The structure of a computer suitable for executing the various methods/processes described herein will appear from the description below.

In addition, the present specification also implicitly discloses a computer program, in that it would be apparent to the person skilled in the art that the individual steps of the method described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the spirit or scope of the disclosure.

Furthermore, one or more of the steps of the computer program may be performed in parallel rather than sequentially. Such a computer program may be stored on any computer readable medium. The computer readable medium may include storage devices, such as magnetic or optical disks, memory chips, or other storage devices suitable for interfacing with a computer. The computer readable medium may also include a hard-wired medium, such as exemplified in the Internet system, or wireless medium, such as exemplified in the GSM mobile telephone system. The computer program, when loaded and executed on such a computer, effectively results in an apparatus that implements the steps of the preferred method.

FIG. 1 shows a flow chart illustrating a method 100 for authorizing an electronic transaction between two entities, according to an example embodiment. For the sake of brevity, the following description is directed to an electronic transaction between two entities. However, the method 100 is equally suited for electronic transactions between three or more entities without the need for extensive modifications.

The first step 102 of the method 100 involves receiving, at a verification module, coincidentally captured facial image data relating to both of the two entities. The coincidentally captured facial image data includes first captured facial image data relating to a first of the two entities and second captured facial image data relating to a second of the two entities. Preferably, the first and the second captured facial image data are captured at substantially the same time (i.e. coincidentally captured, or captured in parallel). In an implementation, the coincidentally captured facial image data may comprise the first captured facial image data with the second captured facial image data appended thereto. In this format, the coincidentally captured facial image data can be viewed as a single data packet and yet can be easily split into its constituent first and second captured facial image data for purposes which will become apparent below.

The verification module may receive the coincidentally captured facial image data from a mobile device (such as a smartphone or tablet computer) comprising two image capturing modules. The first captured facial image data is captured using a first of the two image capturing modules and the second captured facial image data is captured using a second of the two image capturing modules. In an example scenario, both entities are physically present at the same place and at the same time and facing each other, and the first image capturing module is a "front facing" camera of the mobile device and the second image capturing module is a "back facing" camera of the mobile device. One of the two entities, e.g. the first entity, uses the "front facing" camera of his mobile device to capture a photo of his face and uses the "back facing" camera to take a photo of the second entity that is facing him. In this manner, the mobile device is able to acquire the coincidentally captured facial image data relating to both of the two entities.

The verification module may be in communication with a standalone database that is realized using cloud computing storage modules and/or dedicated servers. The verification module may also have an integrated database. In either case, (i) facial image templates relating to each of the two entities and (ii) account data relating to each of the two entities are enrolled in the database. With reference to Table 1, there are four entities enrolled in the database, each having its respective facial image template, account data and reference geographical location data. Further details on the reference geographical location data will be provided below. It will be appreciated by a person skilled in the art that the facial image data shown in Table 1 is merely for illustrative purposes. In actual implementations, the facial image data is in a format appropriate for the execution of facial recognition techniques, such as those disclosed in Li, Stan Z. and Jain, Anil K., "Handbook of Facial Recognition" (Springer, N.Y., 2011), the entirety of which is incorporated herein by reference.

The facial image template and the account data of each entity are linked in the database. In other words, if a particular facial image template is known (e.g. facial image data "A"), the corresponding linked account data (i.e. account number "01-356-8944") can be determined. The account data includes, but is not limited to: account number, name of account holder, transaction amount limit, withdrawal amount limit, and bank name. Only the account number is shown in Table 1.

Turning back to FIG. 1, the second step 104 of the method 100 involves using the verification module to authenticate each of the two entities based on a comparison between the coincidentally captured facial image data (received at step 102) and the respective facial image templates relating to each of the two entities that is enrolled in the database. The comparison may include generating a representation of the captured facial image data (e.g., by a feature extraction process), and comparing the generated representation to one or more template representations stored in the database (the template representations having been generated according to the same process as that used to generate the representation of the captured facial image data). A positive authentication corresponds to a substantial match between the coincidentally captured facial image data and corresponding ones of the facial image templates.

The substantial match between the coincidentally captured facial image data and the corresponding ones of the facial image templates can be based on a pre-defined degree of similarity between the first and the second captured facial image data and the corresponding ones of the facial image templates. Since there may be some difference between the captured facial image data and the facial image template (i.e. not a perfect match), the pre-defined degree of similarity provides for a margin of difference. For example, a system administrator can set the degree of similarity to be 90% to accommodate any differences between the captured facial image data and the facial image template, e.g., due to constantly varying ambient lighting conditions where the facial image is captured.

On determining that each of the two entities are positively authenticated at step 104, the third step 106 involves retrieving, from the database, the account data relating to each of the two entities based on the coincidentally captured facial image data. The step 106 of retrieving the account data relating to each of the two entities based on the coincidentally captured facial image data may include the sub-steps of (a) retrieving the account data relating to the first of the two entities that is linked to the facial image template that has a closest similarity with the first captured facial image data; and (b) retrieving the account data relating to the second of the two entities that is linked to the facial image template that has a closest similarity with the second captured facial image data. For example, with reference to Table 1, the first captured facial image data is compared with all the enrolled facial image templates "A" to "D". If the first captured facial image data has a pre-defined degree of similarity with one of the enrolled facial image templates (e.g. "A"), and the first captured facial image data has a closest similarity to facial image template "A", the account data ("01-356-8944") linked to facial image template "A" is retrieved.

The fourth step 108 of the method 100 involves using the verification module to generate an authorization message for authorizing the electronic transaction. The authorization message includes, but may not be limited to, the account data relating to each of the two entities retrieved from the database at step 106.

On the other hand, if at least one of the two entities is not positively authenticated at step 104, the method 100 may further include generating, using the verification module, a decline message for declining the electronic transaction.

In order to maintain a record of transactions to minimize frauds, facilitate chargebacks, etc., the coincidentally captured facial image data relating to both of the two entities received by the verification module at step 102 is stored in the database. In case there are any disputes after the transaction has taken place, the coincidentally captured facial image data can be retrieved to facilitate investigations. For example, if a user alleges that he did not participate in the transaction, the coincidentally captured facial image data relating to both of the two entities can be reviewed to verify the user's assertion.

To supplement the record of transactions, the method 100 may further include receiving, at the verification module, a transaction identifier relating to the authorized electronic transaction. The received transaction identifier is stored in the database, in association with the coincidentally captured facial image data relating to both of the two entities, as shown in Table 2. In this manner, the coincidentally captured facial image data corresponding to a disputed transaction can be easily retrieved. The transaction identifier is preferably a unique identifier relating to each authorized electronic transaction, and may be generated at a transaction module or payment module that is configured to process transactions. The generated transaction identifier may be transmitted by the transaction module/payment module to the verification module.

To further supplement the record of transactions, the method 100 may further include receiving, at the verification module, a time-stamp relating to a date and time of the coincidentally captured facial image data and/or authorized transaction. The time-stamp is stored in the database, in association with the transaction identifier and the coincidentally captured facial image data relating to both of the two entities, as shown in Table 2. The time-stamp can be used to further facilitate investigations of disputed transactions, for example, when a user alleges that he did not participate in the transaction at a specified time. In Table 2, the time-stamp relates to a date and time of the various authorized transactions.

Turning back to Table 1 (rightmost column), besides enrolling the facial image template and account data relating to each of the two entities in the database, reference geographical location data relating to each of the two entities can also be enrolled in the database. The enrolled reference geographical location data is linked to the corresponding ones of the facial image templates.

The enrolled reference geographical location data can be used to facilitate the method 100 for authorizing the electronic transaction. Specifically, the method 100 can further include the sub-steps of (a) receiving, at the verification module, current geographical location data relating to a current location of the first of the two entities; and (b) comparing, using the verification module, the current geographical location data and the reference geographical location data that is linked to the facial image template that has a closest similarity with the first captured facial image data. The authorization message is only generated on determining that there is a substantial match between the current geographical location data and the reference geographical location data that is linked to the facial image template that has the closest similarity with the first captured facial image data. The reference geographical location data and current geographical location data may be one or more of a country, city, state, town, or geographic coordinates.

Continuing from the example above where the captured facial image data of a first entity has a closest similarity to facial image template "A", now assume that the reference geographical location data that is linked to facial image template "A" is "New York City" and this data is enrolled in the database (see Table 1). The first entity wishes to participate in an electronic transaction with a second entity, and both entities are physically present at the same place in New York City at the same time and facing each other. Besides acquiring the coincidentally captured facial image data relating to both of the two entities, the mobile device (having a suitable location tracking module) is also configured to determine and transmit the current geographical location data to the verification module. If the current geographical location data substantially matches the reference geographical location data of the first entity, the authorization message is generated. Thus, if a third party is in possession of the first entity's mobile device and attempts to participate in an electronic transaction outside the first entity's "registered location", the electronic transaction is declined as the current geographical location data (e.g., Los Angeles) does not substantially match the reference geographical location data (e.g., New York).

A first of the two entities may consist of a single payer (e.g. a single individual) and a second of the two entities may consist of a single payee. In such a case, the electronic transaction comprises an electronic fund transfer from the single payer to the single payee. The electronic fund transfer may be a peer-to-peer (P2P) fund transfer or Electronic funds transfer (EFT).

Alternatively, a first of the two entities may consist of a single payer and a second of the two entities may consist of multiple payees. In such a case, the electronic transaction comprises an electronic fund transfer from the single payer to the multiple payees, and the facial image template relating to the second of the two entities and the second captured facial image data comprise facial image data of each of the multiple payees. Also, the account data relating to the second of the two entities comprises account data of each of the multiple payees. In an implementation, the funds from the single payer can be split equally among the multiple payees. Alternatively, the payer can specify the exact percentage or amount to be split among the multiple payees.

Alternatively, a first of the two entities may consist of a customer and a second of the two entities may consist of an employee of a merchant. In such a case, the electronic transaction comprises an electronic financial transaction between the customer and the merchant. If the merchant has multiple employees, each employee may be considered a separate entity, as will be explained in more detail below. In such a case, the method 100 may include the following steps to optimize the search, lookup or retrieval of facial image templates. At a first step, a geographical location of the transaction can be captured. For example, current geographical location data relating to a current location of the customer is captured by the customer's mobile device having a suitable location tracking module, and the current geographical location data is sent to the verification module. The second step involves a lookup of facial image templates of merchants located at the vicinity of the current geographical location based on the reference geographical location data of the merchant. For example, if the geographical location of the transaction is New York City, only the facial image templates of merchants located in New York City are looked-up. The third step involves authenticating the merchant based on the facial image templates that come as part of the look-up.

Embodiments described herein advantageously allow an electronic transaction to be carried out solely based on the provision of a photo of the entities involved in the electronic transaction. This is in contrast to current electronic transaction solutions, in which sensitive data may be required for the electronic transaction to be carried out, such as an entity's account details, account number, and name of bank, etc.

Figure 2:
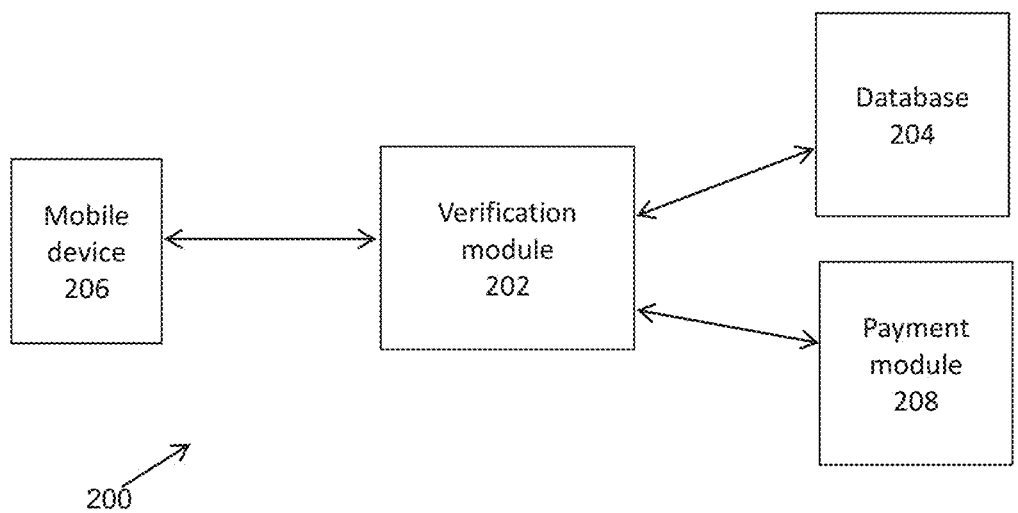
FIG. 2 shows a schematic diagram of a system for authorizing an electronic transaction between two entities, according to an example embodiment.

FIG. 2 shows a schematic diagram of a system 200 for authorizing an electronic transaction between two entities. The system 200 includes a verification module 202 and a database 204 in communication with the verification module 202. The database 204 can be realized using cloud computing storage modules and/or dedicated computer servers. Reference facial image data relating to each of the two entities and account data relating to each of the two entities are enrolled in the database. The facial image template and the account data of each entity are linked in the database, as described above.

The verification module 202 is in communication with a mobile device 206 through known wireless communication protocols/standards. The verification module 202 is configured to receive coincidentally captured facial image data relating to both of the two entities from the mobile device 206 and authenticate each of the two entities based on a comparison between the coincidentally captured facial image data and the respective facial image templates relating to each of the two entities. A positive authentication corresponds to a substantial match between the coincidentally captured facial image data and corresponding ones of the facial image templates.

The coincidentally captured facial image data comprises first captured facial image data relating to a first of the two entities and second captured facial image data relating to a second of the two entities. Preferably, the first and the second captured facial image data are captured at substantially the same time using the mobile device 206.

The verification module 202 is further configured to retrieve, from the database 204, the account data relating to each of the two entities based on the coincidentally captured facial image data, on determining that each of the two entities are positively authenticated. More specifically, the verification module 202 is configured to: retrieve the account data relating to the first of the two entities that is linked to the facial image template that has a closest similarity with the first captured facial image data; and retrieve the account data relating to the second of the two entities that is linked to the facial image template that has a closest similarity with the second captured facial image data.

The verification module 202 is further configured to generate an authorization message for authorizing the electronic transaction. The authorization message includes the account data relating to each of the two entities retrieved from the database. On the other hand, if at least one of the two entities is not positively authenticated, the verification module 202 is further configured to generate a decline message for declining the electronic transaction.

The substantial match between the coincidentally captured facial image data and the corresponding ones of the facial image templates may be based on a pre-defined degree of similarity between the first and the second captured facial image data and the corresponding ones of the facial image templates.

In an implementation, the verification module 202 is further configured to: receive a transaction identifier relating to the authorized electronic transaction; and store, in the database 204, the transaction identifier in association with the coincidentally captured facial image data relating to both of the two entities. Further, the verification module 202 may also be configured to receive, from the mobile device 206, a time-stamp relating to a date and time of the coincidentally captured facial image data; and store, in the database 204, the time-stamp in association with the transaction identifier and the coincidentally captured facial image data relating to both of the two entities.

In an implementation, the database 204 may further comprise reference geographical location data relating to each of the two entities and linked to the corresponding ones of the facial image templates. The verification module 202 may be further configured to: receive, from the mobile device 206, current geographical location data relating to a current location of the first of the two entities; and compare the current geographical location data and the reference geographical location data that is linked to the facial image template that has a closest similarity with the first captured facial image data. The authorization message is generated on determining that there is a substantial match between the current geographical location data and the reference geographical location data that is linked to the facial image template that has the closest similarity with the first captured facial image data.

The verification module 202 may be in communication with a payment module 208 that is configured to facilitate the electronic transaction between the two entities. The authorization message generated by the verification module 202 may be transmitted from the verification module 202 to the payment module 208 for authorizing the electronic transaction. The payment module 208 may also be configured to generate the transaction identifier upon completion of the authorized electronic transaction between the two entities and transmit the transaction identifier to the verification module 202.

Figure 3:
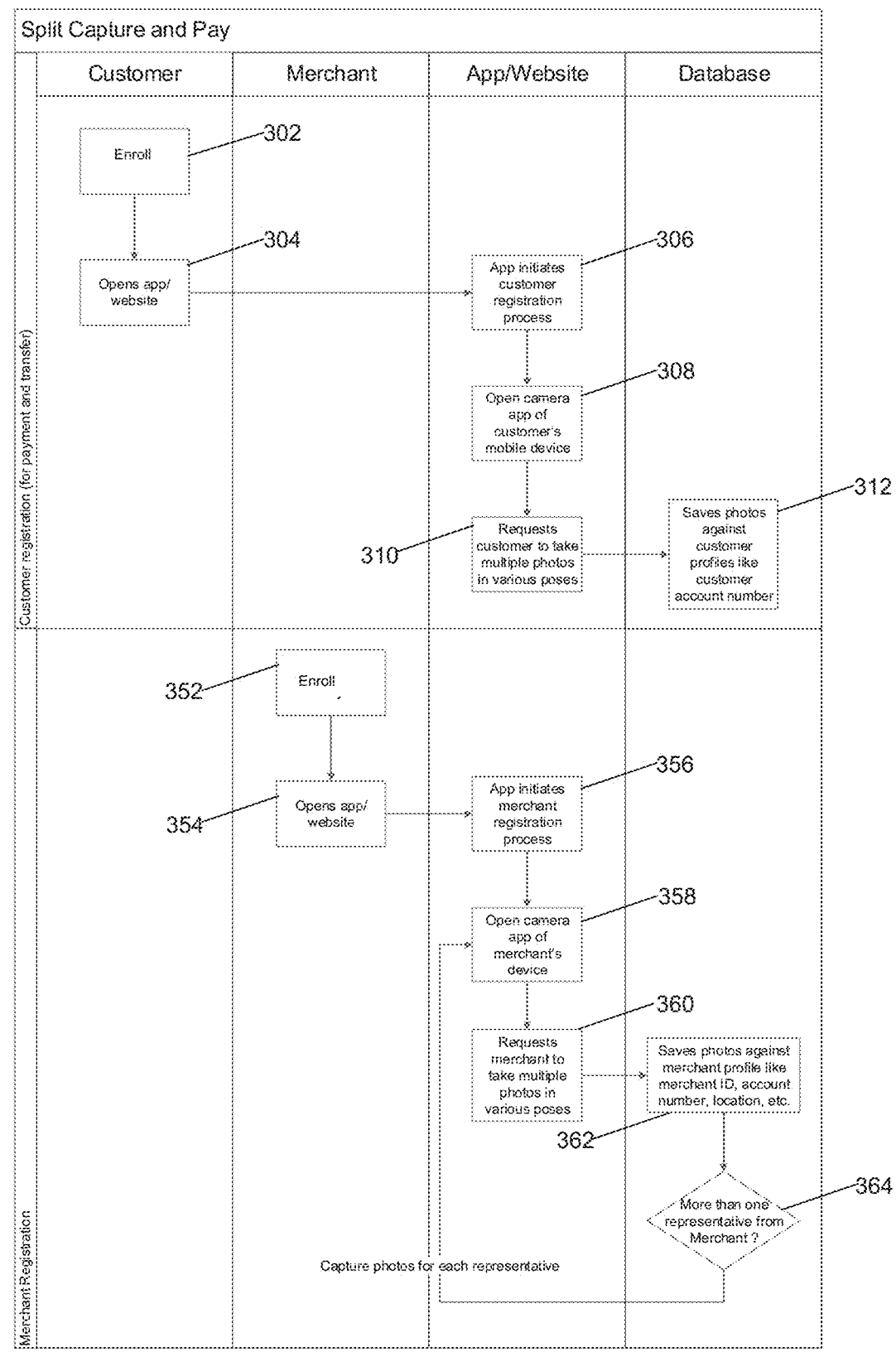
FIG. 3 shows a schematic diagram illustrating flow of information between various entities during a registration phase of a method for authorizing electronic transactions, according to an example embodiment.

FIG. 3 shows a schematic diagram illustrating flow of information between various entities during a registration phase of a method for authorizing electronic transactions between entities, according to an example embodiment. As described above, a first of the two entities may consist of a customer and a second of the two entities may consist of an employee of a merchant. In such a case, the electronic transaction comprises an electronic financial transaction between the customer and the merchant. A customer registration phase 300 begins with the customer (i.e., a first entity) initiating the enrolling process at step 302. The customer may use his mobile device to open a mobile application ("app") or access a website for enrolling at step 304. The mobile application initiates a customer registration process 306, and subsequently activates an image capturing function of the mobile device at step 308. The customer is requested to take at least one photo of himself (in particular, his face). Preferably, at step 310, the customer is requested to take multiple photos of his face in various poses (e.g., smiling, winking, etc.) for added security.

The captured photo(s) are saved against the customer's profile at step 312. The customer's profile may include other types of data, such as the customer's account number. The captured photo(s) are used as references during authentication. Therefore, if at step 310, he winks in the photo(s), a third party trying to impersonate the customer (e.g., by presenting a stolen photograph of the customer in which he is not winking), is not able to easily succeed.

A merchant registration phase 350 begins with the merchant (i.e., a second entity) initiating the enrolling process at step 352. The merchant may use his computer to access a website for enrolling at step 354. The website or application initiates a merchant registration process 356, which subsequently activates an image capturing function of the computer at step 358. The merchant (or employee of the merchant) is requested to take at least one photo of himself (in particular, his face). Preferably, at step 360, the merchant is requested to take multiple photos of his face in various poses (e.g., smiling, winking, etc.) for added security.

The captured photo(s) are saved against the merchant's profile at step 362. The merchant's profile may include other types of data, such as the merchant's identifier, account number, and location. At step 364, if the merchant has more than one employee involved in transactions (e.g., cashiers), steps 358, 360 and 362 are repeated for all such employees. In the case of multiple employees, at step 362, the merchant's data, such as the merchant's identifier, account number, and location, remains unchanged. In other words, the plurality of captured photos are saved against the same merchant profile.

The customer registration phase 300 and the merchant registration phase 350 are typically performed once. After successful registration, the registration phases need not be repeated. The customer and merchant can now participate in electronic transactions, such as the ones described below.

Figure 4:
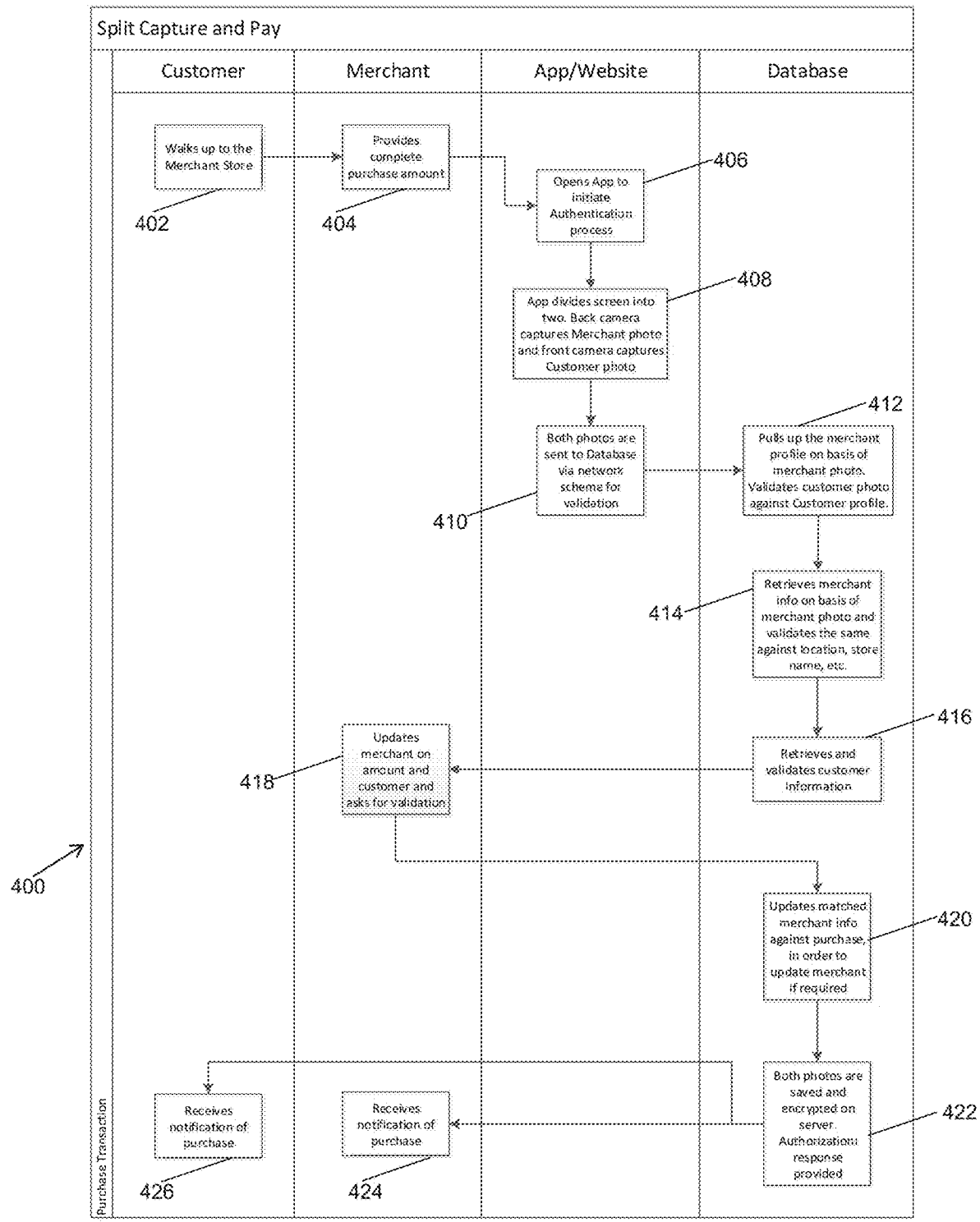
FIG. 4 shows a schematic diagram illustrating flow of information between various entities during a method for authorizing electronic transactions, according to an example embodiment.

FIG. 4 shows a schematic diagram illustrating flow of information between various entities during a method 400 for authorizing electronic transactions, according to an example embodiment. At step 402, a customer visits a merchant's physical store with the intention to purchase one or more products. At step 404, the merchant provides the complete price of the one or more products. The customer opens a mobile application ("app") installed on his mobile device to initiate the authentication process at step 406.

At step 408, the mobile application activates an image capturing function of the mobile device. Preferably, the mobile device has two image capturing modules, in which the first image capturing module is a "front facing" camera of the mobile device and the second image capturing module is a "back facing" camera of the mobile device. The "back facing" camera is used to take a photo of the merchant while the "front facing" camera is used to take a photo of the customer. To facilitate the image capturing process of the customer and merchant, the user interface of the mobile application displays the images of the customer and merchant captured by the respective cameras in a split screen (i.e., the images of both customer and merchant are shown simultaneously on the screen of the mobile device).

At step 410, the image data relating to the images of both customer and merchant (i.e., coincidentally captured facial image data) is sent to a verification module with an integrated database via a network scheme for validation. At step 412, the verification module retrieves the merchant's profile based on the captured facial image data relating to the merchant. The verification module validates the customer based on the captured facial image data relating to the customer. In particular, the customer is validated or authenticated based on the reference photo(s) that were saved against the customer's profile at step 312 above. For example, the customer's captured facial image data is compared against all the customer reference photos registered in the database and a positive validation occurs if there is a pre-defined degree of similarity between the customer's captured facial image data and one of the reference photos.

For added security, validation or authentication of the merchant is performed at step 412. Firstly, the verification module validates the merchant based on the captured facial image data relating to the merchant. In particular, the merchant is validated based on the reference photo(s) that were saved against the merchant's profile at step 362 above. For example, the merchant's captured facial image data is compared against all the merchant reference photos registered in the database and a positive validation occurs if there is a pre-defined degree of similarity between the merchant's captured facial image data and one of the reference photos.

At step 414, further validation or authentication of the merchant may be performed by cross-checking the merchant's location. For example, the customer's mobile device may be configured to transmit a location of the customer to the verification module. Since the merchant is assumed to be at the same location as the customer, it follows that the merchant's location is expected to be the same as the transmitted location of the customer. The verification module cross-checks the transmitted location of the customer to determine whether it matches a reference location of the merchant stored in the database. For example, if the merchant's reference location is New York, and the transmitted location is not within New York City, a possible transaction fraud signal may be triggered. Similarly, a merchant's store name can be cross-checked by requesting that the customer enter the name of the merchant he is currently at. The name of the merchant can be transmitted to the verification module for cross-checking.

Assuming that the customer and merchant are positively authenticated at steps 412 and 414 above, the customer's information (including his account data) is retrieved from the database at step 416. Since the facial image template and the account data of each entity are linked in the database, the relevant account data can be retrieved.

At step 418, the merchant is informed (e.g., via a message transmitted to the merchant's point-of-sale terminal) that the customer has been authenticated. The merchant is requested to confirm that the transaction may proceed.

If the merchant confirms at step 418 that the transaction may proceed, step 420 is executed, which involves updating the relevant merchant information against the customer's purchase using the verification module.

To facilitate subsequent fraud or chargeback investigations, the image data relating to the images of both customer and merchant (i.e., coincidentally captured facial image data) is saved and encrypted in the database for record purposes, at step 422. An authorization response is provided to both the customer and merchant. At step 424, the merchant receives notification of the purchase and releases the one or more products to the customer. Likewise, at step 426, the customer receives notification of the purchase and receives the one or more products from the merchant.

Figure 5:
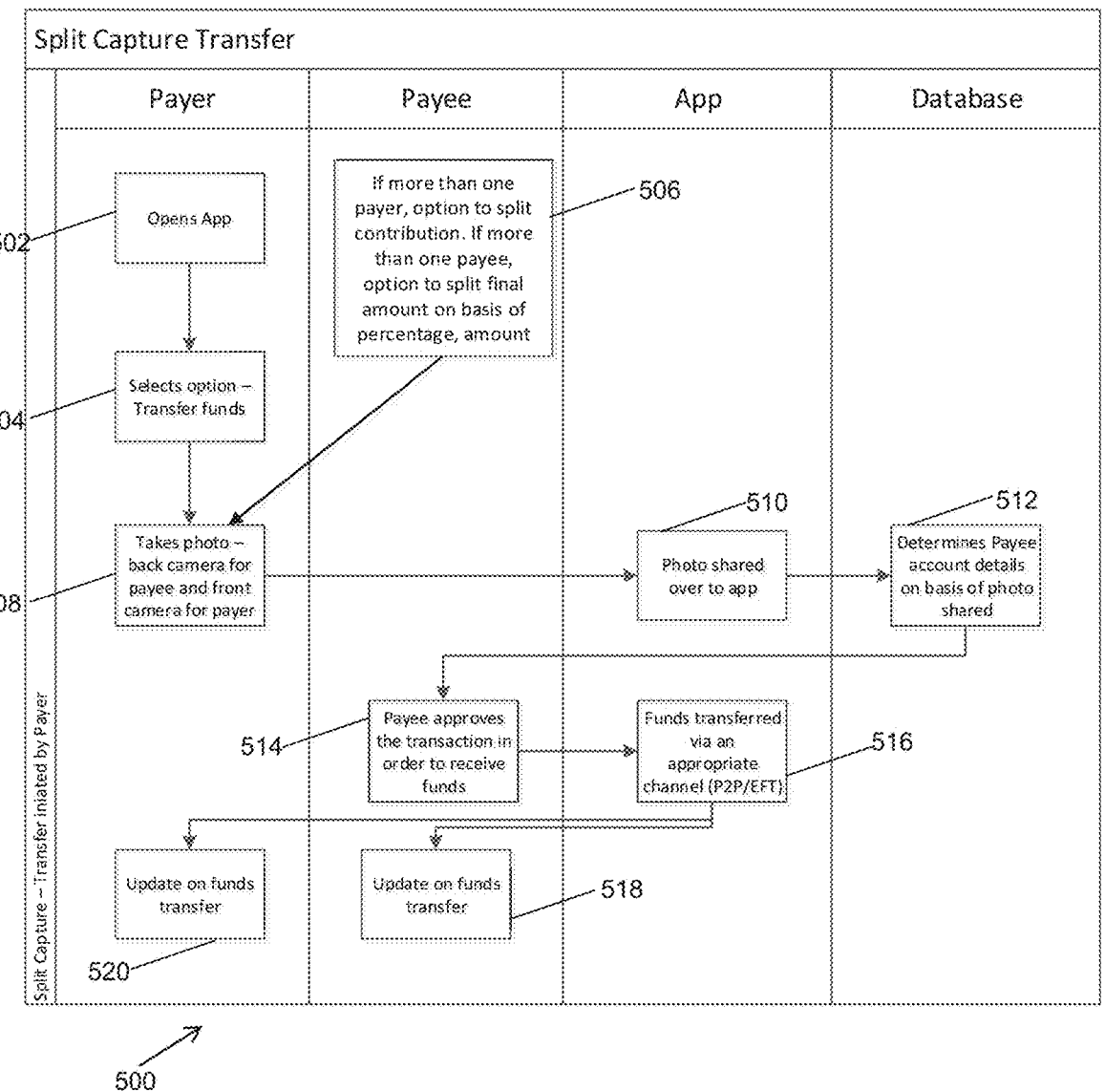
FIG. 5 shows a schematic diagram illustrating flow of information between various entities during a method for authorizing electronic fund transfers, according to an example embodiment.
Figure 6:
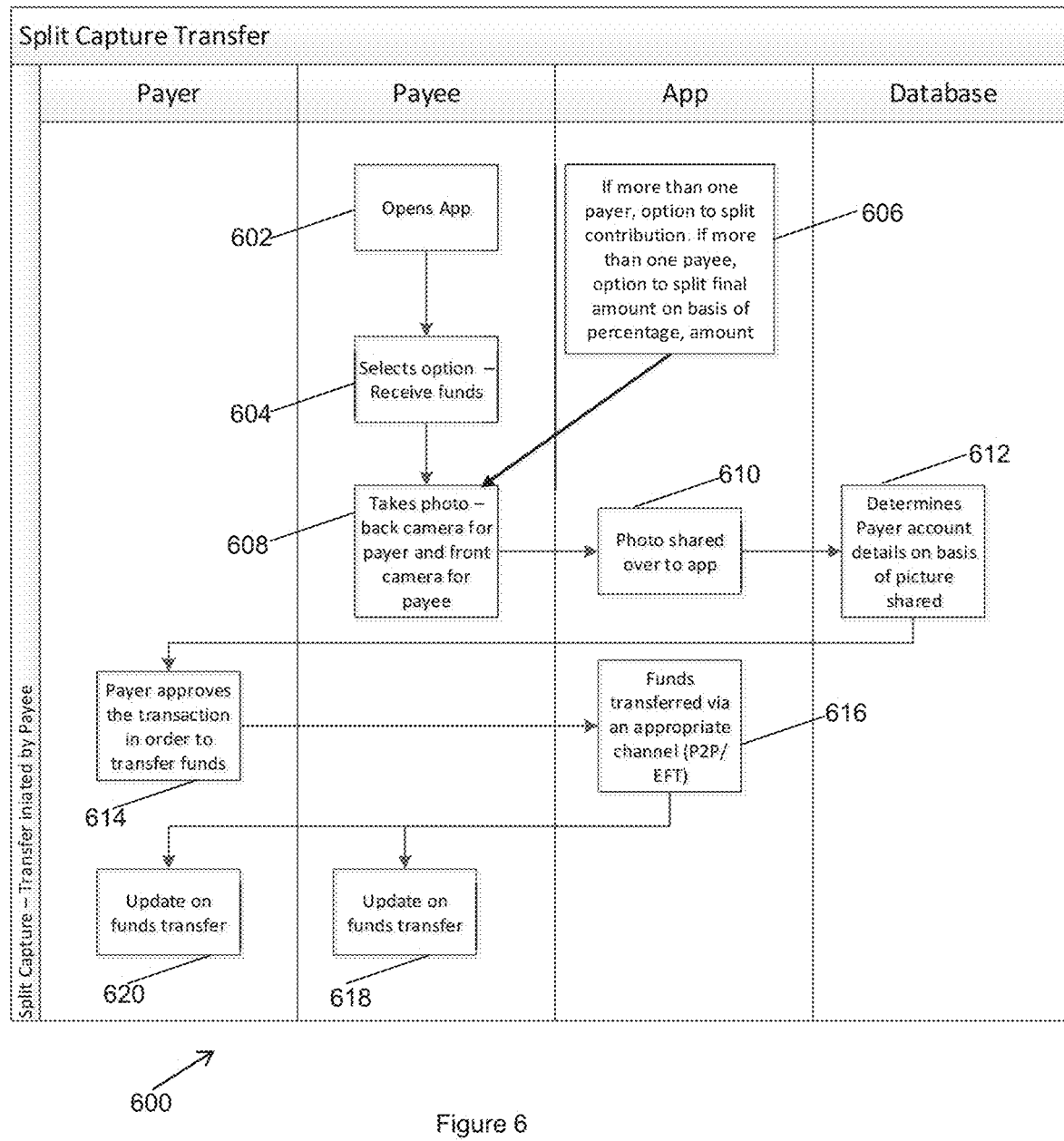
FIG. 6 shows a schematic diagram illustrating flow of information between various entities during a method for authorizing electronic fund transfers, according to an example embodiment.

FIG. 5 shows a schematic diagram illustrating flow of information between various entities during a method 500 for authorizing electronic transactions between entities, according to an example embodiment. As described above, a first of the two entities may consist of a single payer and a second of the two entities may consist of a single payee. In such a case, the electronic transaction and electronic fund transfer are from the single payer to the single payee. Alternatively, the second of the two entities may consist of multiple payees, and the electronic transaction comprises an electronic fund transfer from the single payer to the multiple payees.

At step 502, the payer opens a mobile application ("app") installed on his mobile device to initiate the electronic fund transfer to the payee(s). At step 504, the payer selects an option to transfer funds to the payee(s) that may be provided on a user interface of the mobile application. At step 506, if there is more than one payee, the payer can have the option to split the transferred funds equally among the multiple payees or specify the exact percentage or amount to be split among the multiple payees.

Assuming that the payer and payee(s) are physically present at the same place and at the same time and facing each other, and a first image capturing module is a "front facing" camera of the payer's mobile device and a second image capturing module is a "back facing" camera of the payer's mobile device, the payer uses the "back facing" camera of his mobile device to capture a photo of the payee(s) and uses the "front facing" camera to take a photo of himself. In this manner, the mobile device acquires a coincidentally captured facial image data relating to both of the two entities at step 508.

At step 510, the coincidentally captured facial image data is transmitted from the payer's mobile device to a verification module having an integrated database. At step 512, the payee's/payees' account data are retrieved or determined based on the coincidentally captured facial image data on determining that the payer and payee(s) are positively authenticated (i.e., there is a substantial match between the coincidentally captured facial image data and corresponding facial image templates of the payer and payee(s)).

At step 514, the payee(s) approve the receipt of funds from the payer. At step 516, the funds are transferred from the payer to payee(s) via appropriate channels, e.g., peer-to-peer (P2P) fund transfers or Electronic funds transfers (EFT). Finally, at steps 518 and 520, the payee(s) and payer are informed of the successful fund transfer, respectively.

As an alternative to the method 500 described above, there is provided a method 600 for authorizing electronic transactions between entities, according to an example embodiment. A first of the two entities may consist of a single payer and a second of the two entities may consist of a single payee. In such a case, the electronic transaction and electronic fund transfer are from the single payer to the single payee. However, in contrast to method 600, the payee initiates the fund transfer by requesting to receive funds from the payer. The first of the two entities may consist of multiple payers, and the electronic transaction comprises an electronic fund transfer from the multiple payers to the single payee.

At step 602, the payee opens a mobile application ("app") installed on his mobile device to initiate the electronic fund transfer from the payer(s). At step 604, the payee selects an option to receive funds from the payer(s) that may be provided on a user interface of the mobile application. At step 606, if there is more than one payer, there may be an option to have the transferred funds received from the multiple payers in equal proportions or based on a specific percentage or amount from the multiple payers.

Assuming that the payer(s) and payee are physically present at the same place and at the same time and facing each other, and a first image capturing module is a "front facing" camera of the payee's mobile device and a second image capturing module is a "back facing" camera of the payee's mobile device, the payee uses the "back facing" camera of his mobile device to capture a photo of the payer(s) and uses the "front facing" camera to take a photo of himself. In this manner, the mobile device acquires a coincidentally captured facial image data relating to both of the two entities at step 608.

At step 610, the coincidentally captured facial image data is transmitted from the payee's mobile device to a verification module having an integrated database. At step 612, the payer's/payers' account data are retrieved or determined based on the coincidentally captured facial image data on determining that the payer(s) and payee are positively authenticated (i.e., there is a substantial match between the coincidentally captured facial image data and corresponding facial image templates of the payer(s) and payee).

At step 614, the payer(s) approve the transfer of funds to the payee. At step 616, the funds are transferred from the payer(s) to payee via appropriate channels, e.g., peer-to-peer (P2P) fund transfers or Electronic funds transfers (EFT). Finally, at steps 618 and 620, the payee and payer(s) are informed of the successful fund transfer, respectively.

Figure 7:
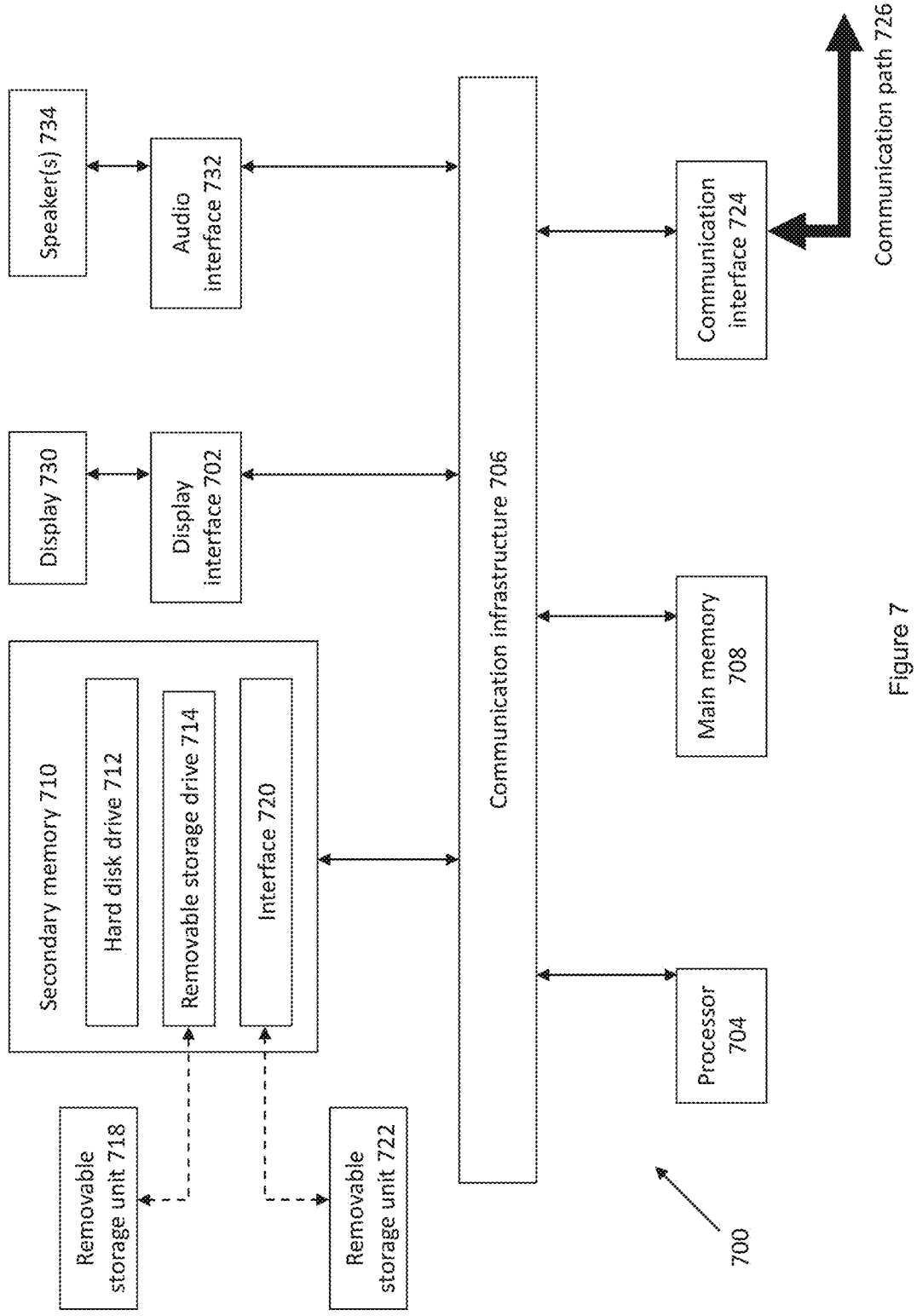
FIG. 7 shows a schematic diagram of a computer system suitable for use in executing the method for authorizing an electronic transaction between two entities.

FIG. 7 shows a schematic diagram of a computer device/system 700 suitable for use realizing the verification module 202. The following description of the computing device 700 is provided by way of example only and is not intended to be limiting.

As shown in FIG. 7, the example computing device 700 includes a processor 704 for executing software routines. Although a single processor is shown for the sake of clarity, the computing device 700 may also include a multi-processor system. The processor 704 is connected to a communication infrastructure 706 for communication with other components of the computing device 700. The communication infrastructure 706 may include, for example, a communications bus, cross-bar, or network.

The computing device 700 further includes a main memory 708, such as a random access memory (RAM), and a secondary memory 710. The secondary memory 710 may include, for example, a hard disk drive 712 and/or a removable storage drive 714, which may include a magnetic tape drive, an optical disk drive, or the like. The removable storage drive 714 reads from and/or writes to a removable storage unit 718 in a well-known manner. The removable storage unit 718 may include a magnetic tape, optical disk, or the like, which is read by and written to by removable storage drive 714. As will be appreciated by persons skilled in the relevant art(s), the removable storage unit 718 includes a computer readable storage medium having stored therein computer executable program code instructions and/or data.

In an alternative implementation, the secondary memory 710 may additionally or alternatively include other similar means for allowing computer programs or other instructions to be loaded into the computing device 700. Such means can include, for example, a removable storage unit 722 and an interface 720. Examples of a removable storage unit 722 and interface 720 include a program cartridge and cartridge interface (such as that found in video game console devices), a removable memory chip (such as an EPROM or PROM) an associated socket, and other removable storage units 722 and interfaces 720 which allow software and data to be transferred from the removable storage unit 722 to the computer system 700.

The computing device 700 also includes at least one communication interface 724. The communication interface 724 allows software and data to be transferred between computing device 700 and external devices via a communication path 726. In various embodiments of the disclosures, the communication interface 724 permits data to be transferred between the computing device 700 and a data communication network, such as a public data or private data communication network. The communication interface 724 may be used to exchange data between different computing devices 700 which such computing devices 700 form part of an interconnected computer network. Examples of a communication interface 724 can include a modem, a network interface (such as an Ethernet card), a communication port, an antenna with associated circuitry, and the like. The communication interface 724 may be wired or may be wireless. Software and data transferred via the communication interface 724 are in the form of signals which can be electronic, electromagnetic, optical or other signals capable of being received by communication interface 724. These signals are provided to the communication interface via the communication path 726.

As shown in FIG. 7, the computing device 700 further includes a display interface 702 which performs operations for rendering images to an associated display 730 and an audio interface 732 for performing operations for playing audio content via associated speaker(s) 734.

As used herein, the term "computer program product" may refer, in part, to removable storage unit 718, removable storage unit 722, a hard disk installed in hard disk drive 712, or a carrier wave carrying software over communication path 726 (wireless link or cable) to communication interface 724. Computer readable storage media refers to any non-transitory tangible storage medium that provides recorded instructions and/or data to the computing device 700 for execution and/or processing. Examples of such storage media include floppy disks, magnetic tape, CD-ROM, DVD, Blu-ray™ Disc, a hard disk drive, a ROM or integrated circuit, USB memory, a magneto-optical disk, or a computer readable card such as a PCMCIA card and the like, whether or not such devices are internal or external of the computing device 700. Examples of transitory or non-tangible computer readable transmission media that may also participate in the provision of software, application programs, instructions and/or data to the computing device 700 include radio or infra-red transmission channels as well as a network connection to another computer or networked device, and the Internet or Intranets including e-mail transmissions and information recorded on Websites, and the like.

The computer programs (also called computer program code) are stored in main memory 708 and/or secondary memory 710. Computer programs can also be received via the communication interface 724. Such computer programs, when executed, enable the computing device 700 to perform one or more features of embodiments discussed herein. In various embodiments, the computer programs, when executed, enable the processor 704 to perform features of the above-described embodiments. Accordingly, such computer programs represent controllers of the computing device 700.

Software may be stored in a computer program product and loaded into the computing device 700 using the removable storage drive 714, the hard disk drive 712, or the interface 720. Alternatively, the computer program product may be downloaded to the computing device 700 over the communications path 726. The software, when executed by the processor 704, causes the computing device 700 to perform functions of embodiments described herein.

It is to be understood that the embodiment of FIG. 7 is presented merely by way of example. Therefore, in some embodiments, one or more features of the computing device 700 may be omitted. Also, in some embodiments, one or more features of the computing device 700 may be combined together. Additionally, in some embodiments, one or more features of the computing device 700 may be split into one or more component parts.

It will be appreciated by a person skilled in the art that numerous variations and/or modifications may be made to the present disclosure as shown in the specific embodiments without departing from the spirit or scope of the disclosure as broadly described. The present embodiments are, therefore, to be considered in all respects to be illustrative and not restrictive.

With that said, and as described, it should be appreciated that one or more aspects of the present disclosure transform a general-purpose computing device (or computer) into a special-purpose computing device when configured to perform the functions, methods, and/or processes described herein. In connection therewith, in various embodiments, computer-executable instructions (or code) may be stored in memory of such computing device for execution by a processor to cause the processor to perform one or more of the functions, methods, and/or processes described herein, such that the memory is a physical, tangible, and non-transitory computer readable storage media. Such instructions often improve the efficiencies and/or performance of the processor that is performing one or more of the various operations herein. It should be appreciated that the memory may include a variety of different memories, each implemented in one or more of the operations or processes described herein. What's more, a computing device as used herein may include a single computing device or multiple computing devices.

In addition, the terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

Again, the foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for authorizing an electronic transaction between two entities, the method comprising:

receiving, at a verification module, coincidentally captured facial image data comprising a first captured facial image data relating to a payer entity and a second captured facial image data relating to a payee entity, wherein the coincidentally captured facial image data is received from a mobile device comprising two image capturing modules, and wherein the first captured facial image data is captured using a first of the two image capturing modules and the second captured facial image data is captured using a second of the two image capturing modules;

authenticating each of the two entities, using the verification module, based on a comparison between the coincidentally captured facial image data and respective facial image templates relating to each of the two entities enrolled in a database, wherein a positive authentication corresponds to a substantial match between the coincidentally captured facial image data and corresponding ones of the facial image templates, wherein account data relating to each of the two entities is enrolled in the database, and wherein the facial image template and the account data of each entity are linked;

retrieving, from the database, the account data relating to each of the two entities based on the coincidentally captured facial image data, upon determining that each of the two entities are positively authenticated; and generating, using the verification module, an authorization message for authorizing the electronic transaction, the authorization message comprising the account data relating to each of the two entities retrieved from the database.

2. The method as claimed in claim 1, wherein retrieving the account data relating to each of the two entities based on the coincidentally captured facial image data comprises:

retrieving the account data relating to the payer entity that is linked to the facial image template that has a closest similarity with the first captured facial image data; and retrieving the account data relating to the payee entity that is linked to the facial image template that has a closest similarity with the second captured facial image data.

3. The method as claimed in claim 1, further comprising:

receiving, at the verification module, a transaction identifier relating to the authorized electronic transaction;

storing, in the database, the transaction identifier in association with the coincidentally captured facial image data relating to both of the two entities;

receiving, at the verification module, a time-stamp relating to a date and time of the coincidentally captured facial image data; and storing, in the database, the time-stamp in association with the transaction identifier and the coincidentally captured facial image data relating to both of the two entities.

4. The method as claimed in claim 1, further comprising:

generating, using the verification module, a decline message for declining the electronic transaction on a condition that at least one of the two entities is not positively authenticated.

5. The method as claimed in claim 1, wherein reference geographical location data relating to each of the two entities is enrolled in the database and linked to the corresponding ones of the facial image templates, and wherein the method further comprises:

receiving, at the verification module, current geographical location data relating to a current location of the payer entity;

comparing, using the verification module, the current geographical location data and the reference geographical location data that is linked to the facial image template that has a closest similarity with the first captured facial image data;

wherein the authorization message is generated on determining that there is a substantial match between the current geographical location data and the reference geographical location data that is linked to the facial image template that has the closest similarity with the first captured facial image data.

6. The method as claimed in claim 1, wherein the payer entity consists of a single payer and the payee entity consists of a single payee, and the electronic transaction comprises an electronic fund transfer from the single payer to the single payee.

7. The method as claimed in claim 1, wherein the payer entity consists of a single payer and the payee entity consists of multiple payees, and the electronic transaction comprises an electronic fund transfer from the single payer to the multiple payees; and wherein the facial image template relating to the payee entity and the second captured facial image data comprise facial image data of each of the multiple payees, and the account data relating to the payee entity comprises account data of each of the multiple payees.

8. The method as claimed in claim 1, wherein the payer entity consists of a customer and the payee entity consists of an employee of a merchant, and the electronic transaction comprises an electronic financial transaction between the customer and the merchant, wherein reference geographical location data relating to each of the two entities is enrolled in the database and linked to the corresponding ones of the facial image templates, and wherein the method further comprises:

receiving, at the verification module, current geographical location data relating to a current location of the payer entity;

looking-up, using the verification module, the facial image templates that are linked to the reference geographical location data having a similarity with the current geographical location data; and authenticating the payee entity, using the verification module, based on a comparison between the coincidentally captured facial image data and the looked-up facial image templates.

9. A system for authorizing an electronic transaction between two entities, the system comprising:

a verification module in communication with a mobile device, the mobile device comprising two image capturing modules; and a database in communication with the verification module, the database comprising:

respective facial image templates relating to each of a payer entity and a payee entity; and account data relating to each of the two entities, wherein the facial image template and the account data of each entity are linked;

wherein the verification module is configured to:

receive coincidentally captured facial image data from the mobile device, the coincidentally captured facial image data comprising a first captured facial image data relating to the payer entity and a second captured facial image data relating to the payee entity, and wherein the first captured facial image data is captured using a first of the two image capturing modules and the second captured facial image data is captured using a second of the two image capturing modules;

authenticate each of the two entities based on a comparison between the coincidentally captured facial image data and the facial image templates relating to each of the two entities, wherein a positive authentication corresponds to a substantial match between the coincidentally captured facial image data and corresponding ones of the facial image templates;

retrieve, from the database, the account data relating to each of the two entities based on the coincidentally captured facial image data, on determining that each of the two entities are positively authenticated; and generate an authorization message for authorizing the electronic transaction, the authorization message comprising the account data relating to each of the two entities retrieved from the database.

10. The system as claimed in claim 9,
wherein the verification module is further configured to:
retrieve the account data relating to the payer entity that is linked to the facial image template that has a closest similarity with the first captured facial image data; and
retrieve the account data relating to the payee entity that is linked to the facial image template that has a closest similarity with the second captured facial image data.

11. The system as claimed in claim 9, wherein the verification module is further configured to:
receive a transaction identifier relating to the authorized electronic transaction; and
store, in the database, the transaction identifier in association with the coincidentally captured facial image data relating to both of the two entities.

12. The system as claimed in claim 11, wherein the verification module is further configured to:
receive, from the mobile device, a time-stamp relating to a date and time of the coincidentally captured facial image data; and
store, in the database, the time-stamp in association with the transaction identifier and the coincidentally captured facial image data relating to both of the two entities.

13. The system as claimed in claim 9, wherein the verification module is further configured to:
generate a decline message for declining the electronic transaction on a condition that at least one of the two entities is not positively authenticated.

14. The system as claimed in claim 10, wherein the database further comprises reference geographical location data relating to each of the two entities and linked to the corresponding ones of the facial image templates, and wherein the verification module is further configured to:
receive, from the mobile device, current geographical location data relating to a current location of the payer entity;
compare the current geographical location data and the reference geographical location data that is linked to the facial image template that has a closest similarity with the first captured facial image data;
wherein the authorization message is generated on determining that there is a substantial match between the current geographical location data and the reference geographical location data that is linked to the facial image template that has the closest similarity with the first captured facial image data.

15. The system as claimed in claim 9, wherein the payer entity consists of a single payer and the payee entity consists of a single payee, and the electronic transaction comprises an electronic fund transfer from the single payer to the single payee.

16. The system as claimed in claim 10, wherein the payer entity consists of a single payer and the payee entity consists of multiple payees, and the electronic transaction comprises an electronic fund transfer from the single payer to the multiple payees; and
wherein the facial image template relating to the payee entity and the second captured facial image data comprise facial image data of each of the multiple payees, and the account data relating to the payee entity comprises account data of each of the multiple payees.

17. The system as claimed in claim 9, wherein the payer entity consists of a customer and the payee entity consists of an employee of a merchant, and the electronic transaction comprises an electronic financial transaction between the customer and the merchant, wherein the database further comprises reference geographical location data relating to each of the two entities and linked to the corresponding ones of the facial image templates, and wherein the verification module is further configured to:
receive current geographical location data relating to a current location of the payer entity;
look-up the facial image templates that are linked to the reference geographical location data having a similarity with the current geographical location data; and
authenticate the payee entity based on a comparison between the coincidentally captured facial image data and the looked-up facial image templates.

18. The system as claimed in claim 11, wherein the verification module is in communication with a payment module that is configured to facilitate the electronic transaction between the two entities, and wherein the verification module is further configured to transmit the authorization message to the payment module for authorizing the electronic transaction; and
wherein the payment module is configured to:
generate the transaction identifier upon completion of the authorized electronic transaction between the two entities; and
transmit the transaction identifier to the verification module.

* * * * *